United States Patent [19]

Bradley

[11] Patent Number: 4,949,880
[45] Date of Patent: Aug. 21, 1990

[54] HOMOGENIZER/PROPORTIONER DISPENSER FOR BOTTLES

[76] Inventor: Lawrence T. Bradley, 2723 Harrington Mews, Regina, Saskatchewan, Canada, S4T 7S8

[21] Appl. No.: 204,261

[22] Filed: Jun. 9, 1988

[30] Foreign Application Priority Data

Jun. 8, 1987 [CA] Canada .................................. 539152

[51] Int. Cl.⁵ ........................................... G01F 11/26
[52] U.S. Cl. ...................... 222/454; 222/564
[58] Field of Search ............... 222/564, 454, 455, 456, 222/457, 457.5; 141/319, 322

[56] References Cited

U.S. PATENT DOCUMENTS

| | | | |
|---|---|---|---|
| 1,456,408 | 5/1923 | Scherer | 222/564 |
| 1,773,475 | 8/1930 | Casey | 222/454 X |
| 1,949,130 | 2/1934 | Renfro | . |
| 2,091,929 | 8/1937 | Kappenberg | . |
| 2,094,539 | 9/1937 | Jewett | 222/454 X |
| 2,121,424 | 6/1938 | Colombo | 222/455 |
| 2,149,989 | 3/1939 | Ashley | 222/454 X |
| 2,407,377 | 9/1946 | Meyer | . |
| 2,790,581 | 4/1957 | Harter | . |
| 3,185,357 | 5/1965 | Merkel | . |
| 3,235,143 | 2/1966 | Goodrich | . |
| 3,288,335 | 11/1966 | Steffens et al. | . |
| 3,353,725 | 11/1967 | Caceres | 222/564 X |
| 3,716,173 | 2/1973 | Yasso | 222/564 X |
| 3,836,055 | 9/1974 | Katzmark et al. | 222/456 X |
| 4,015,758 | 4/1977 | Cavazza | 222/457.5 |
| 4,214,679 | 7/1980 | Whang | 222/456 X |

FOREIGN PATENT DOCUMENTS

| | | | |
|---|---|---|---|
| 1397362 | 3/1965 | France | 222/456 |
| 275908 | 8/1927 | United Kingdom | 222/456 |

*Primary Examiner*—Michael S. Huppert
*Attorney, Agent, or Firm*—Stanley G. Ade; Murray E. Thrift; Adrian Battison

[57] ABSTRACT

When dispensing unhomogenized materials from bottles such as those containing some salad dressings, mint sauce and the like, it is difficult to obtain a portion thereof with the correct proportions of the unmixed ingredients even though they are shaken before dispensing, because of the rapid settlement of the heavier fraction or fractions. The present device consists of a small cylinder insertable in or formed integrally with the bottle neck and having a vertical web dividing the neck into two chambers, one chamber being open at the upper and lower ends and the other being closed at the base and open at the top to communicate with the top portion of the first chamber. When the cap is secured to the top of the bottle neck, the contents can be shaken whereupon the bottle is inverted so that the contents flow through the first chamber and fill the second chamber. The bottle is then returned to the upright position and the cap removed thus allowing the portion within the second chamber to be poured therefrom and this portion contains a reasonable sample of the contents. Baffles may be provided in the first chamber to retard the passage of the contents of the bottle therethrough during the relatively short pouring action required to dispense the contents of the second chamber through the open neck.

8 Claims, 1 Drawing Sheet

U.S. Patent  Aug. 21, 1990  4,949,880
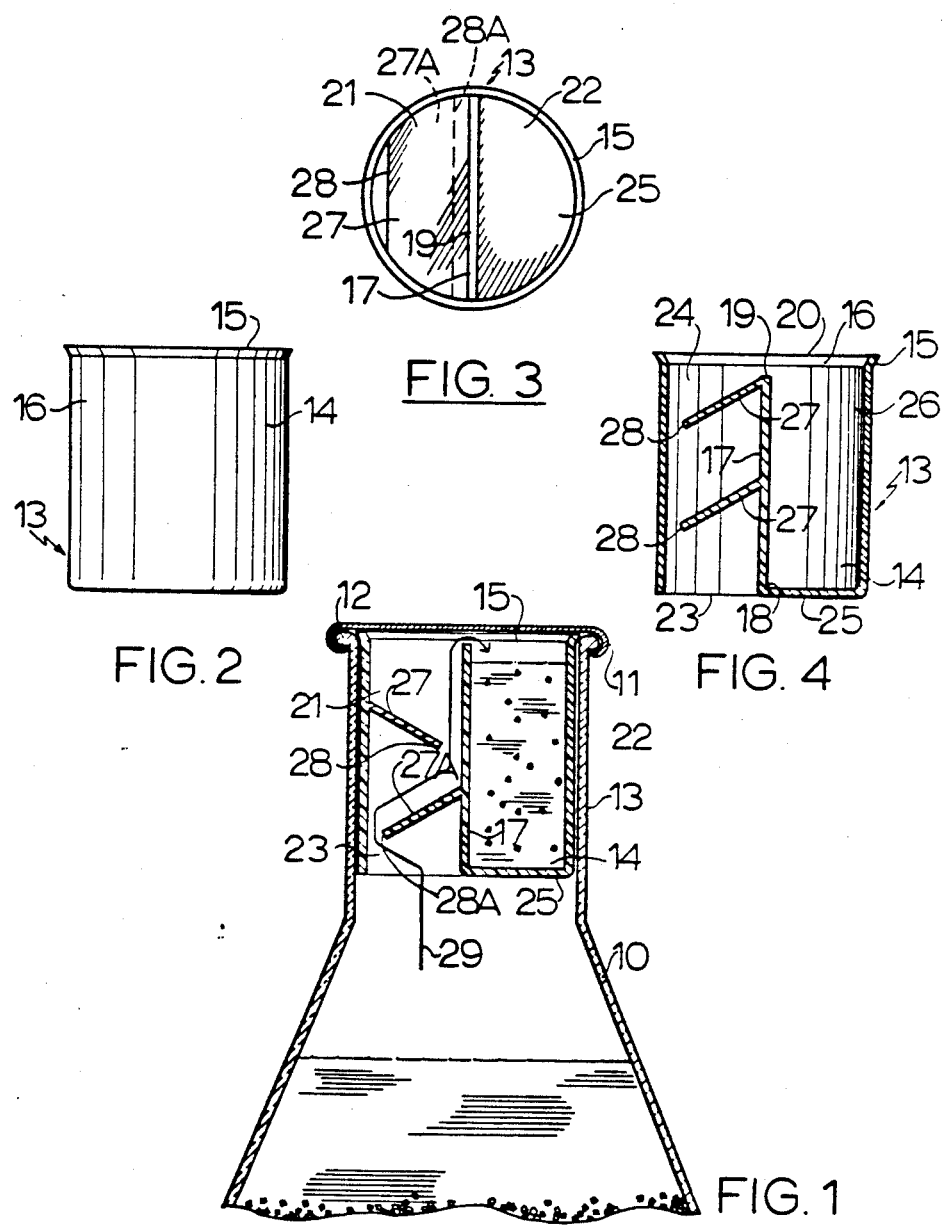

HOMOGENIZER/PROPORTIONER DISPENSER FOR BOTTLES

BACKGROUND OF THE INVENTION

This invention relates to new and useful improvements in dispensing means for bottles which contain pourable mixtures of unhomogenized ingredients having different specific gravities.

Examples include some salad dressings which may contain both a liquid and a solid fraction, and an unhomogenized mixture of oil and vinegar together with solids such as herbs; and mint sauce and the like which contains comminuted mint leaves in vinegar.

With this type of dressing, by the time the agitation has taken place and the cap has been removed, much of the heavier fraction has settled to the bottom of the bottle so that a relatively even mixture of ingredients is impossible to dispense. Furthermore, the amount of some dressings are difficult to gauge and uncertainty exists when pouring same.

PRIOR ART

Prior art known to applicant consists of the following:

U.S. Pat. No. 1,949,130, Feb. 24, 1934, G. Renfro.

This shows a measuring device for a predetermined amount of medicine, said device being inserted within the feller neck.

U.S. Pat. No. 2,091,929, Aug. 31, 1937, W. Cappenberg.

This shows a measuring dispenser screw threadably engageable over the head of a medicine bottle and enabling a predetermined amount of medicine to be dispensed therefrom.

U.S. Pat. No. 2,407,377, Sept. 10, 1946, M. L. Meyer.

This shows a tiltable trap chamber for measuring a predetermined amount from a bottle and then dispensing same.

U.S. Pat. No. 2,790,581, Apr. 30, 1957, C. H. Harter.

This shows a dispensing cap for mounting on a bottle consisting of two chambers for dispensing a predetermined amount of the contents of the bottle.

U.S. Pat. No. 3,185,357, May 25, 1965, H. Merkel.

This shows a dispensing device for granular or pulverulent materials which includes a slide valve release plate.

U.S. Pat. No. 3,235,143, Feb. 15, 1966, W. J. Goodrich.

This shows a dispensing container with two inclined plates secured to and extending from opposite sides of the container.

U.S. Pat. No. 3,288,335, Nov. 29, 1966, H. Steffens.

This shows a metering device for dispensing identical quantities of liquid from a container and includes a first measuring portion and a second dispensing portion.

The present invention overcomes these disadvantages by permitting a measured amount of the contents of a bottle to be deposited within a chamber within the neck of the bottle after agitation so that a reasonable proportion of the various ingredients is contained therein. Then when the cap is removed, this measured portion can be poured from the open neck of the bottle readily and easily. Also, the open chamber may be employed to select any amount of the contents desired.

Although the invention can be formed integrally with the bottle, the preferred embodiment includes a plastic insert which is easily insertable and removable from the neck of the bottle so that it can be re-used after the contents of the bottle have been depleted.

In accordance with the invention there is provided a dispenser for the neck of bottles which contain two or more unhomogenized ingredients of different specific gravities; comprising a vertically situated web spanning the neck and dividing same into a first chamber and a second chamber, the upper end of said web being spaced downwardly from the upper open end of the neck, said first chamber constituting an open-ended channel communicating with the interior of the bottle and the open end of the neck thereof and the second chamber having a closed lower end and communicating at the upper end thereof with the upper end of said first chamber and acting as a temporary retaining chamber for a quantity of the contents of the bottle prior to dispensing the contents of the second chamber from the open end of the neck.

In accordance with a further aspect of the invention, there is provided an insert for the necks of bottles which contain two or more unhomogenized ingredients of different specific gravities, said insert comprising a cylindrical member and a vertically situated web or spanning the walls of said member and defining a pair pf substantially equal volume chambers, a first chamber and a second chamber, the upper end of said web being spaced downwardly from the open upper end of said cylindrical member, said first chamber constituting an open ended channel communicating with the interior of the bottle and the open end of the neck thereof and the second chamber having a closed lower end and communicating at the upper end thereof with the upper end of said first chamber and acting as a temporary retaining chamber for a quantity of the contents of the bottle prior to dispensing the contents of the second chamber from the open end of the neck.

Another advantage of the invention is that baffles may be provided in a portion of the dispenser which, while permitting contents to be poured directly from the bottle if desired, at the same time retard the flow of contents while the measured amount is poured from the bottle. These baffles also act to prevent as yet unmixed fluids from entering the retaining chamber during agitation.

Another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevation of a salad dressing bottle shown partially in section, with an insert engaged within the neck of the bottle, said insert also being shown in vertical section.

FIG. 2 is a side elevation of a plastic insert per se.

FIG. 3 is a top plan view of FIG. 2.

FIG. 4 is a vertical section showing an alternative baffle construction.

In the drawings like characters of reference indicate corresponding parts in the different Figures.

DETAILED DESCRIPTION

Before proceeding to describe the invention in detail, it should be stressed that the drawings show the invention in the form of an insert for the neck of a bottle but it should be understood that the dispensing means could be incorporated integrally with a bottle, particularly one made of plastic.

In FIG. 1, reference character 10 illustrates a conventional salad dressing bottle having a snap cap 11 engageable over the upper annular bead 12 formed around the upper end of the neck 13 thereof. The bottle may be made from glass or synthetic plastic and the snap lid, which is usually plastic, may instead take the form of a metal or plastic screw type closure.

The invention collectively designated 13 constitutes sa dispenser in the form of the insert illustrated. This insert is preferably a cylindrical member 14 made of plastic and having an out-turned lip 15 formed around the upper open end 16 thereof with the dimensions of the outside of the cylindrical member 14 being such that it is a friction fit when inserted within the upper portion of the neck 13 of the salad dressing bottle 10 with the flange 15 limiting the downward movement of the insert within the bottle as clearly shown in FIG. 1.

Once engaged within the neck of the bottle and pushed downwardly until the flange 15 engages the upper open end of the bottle, the snap cap 11 may be engaged or disengaged or the conventional screw-threaded closure may be used without interference from the insert. Alternatively, the cap may be attached to the insert or dispenser if desired.

A vertical web 17 spans the interior of the insert and extends from the base 18 thereof and terminates at a point 19 spaced just below the open upper end 20 of the insert thus dividing the insert into two approximately equal volumed chambers, 21 and 22.

The chamber 21 is open based as indicated at 23 and is open at the upper end as indicated by reference character 24 whereas chamber 22 is provided with a closed base 25 and is open at the upper end 26 and also communicates over the upper end of the web 17, with the chamber 24 as clearly shown in the drawings.

Depending upon the type of material being dispensed, it may be desirable to retard the flow of the contents through chamber 24. This is particularly true if the contents are relatively free flowing such as mint sauce or the like. In FIG. 1, baffles 27 are shown and in this instance two such baffles are illustrated.

Both of these baffles span the majority of the cross sectional area of the chamber 23, the lower baffle being secured transversely to one side of the web 17 and extending inwardly and downwardly therefrom. The upper baffle being secured to the inner surface of the wall of the cylindrical member 14. The lower baffle terminates as at 28A, spaced from the opposite side of the inner wall to the web 17 and this baffle extends outwardly and downwardly from the web.

The uppermost baffle 27 is spaced above baffle 27 and extends from the inner surface of the wall of the member 14, terminating as at 28A, spaced froom the web 17 thus defining, with baffle 27, a serpentine path through the chamber as indicated by th arrow 29.

FIG. 4 shows an alternative arrangement in which a pair of baffles is illustrated both extending from the web 17 and being situated one above the other similar to baffles 27 hereinbefore described.

The baffle construction shown in FIG. 4 is advantageous if it is desirable to have a choice of pouring the contents of the bottle directly therefrom or via the storage or metering chamber 22. Furthermore, the baffles inhibit the unwanted transfer of fluid to the closed chamber during shaking.

In operation, the insert is engaged within the neck of the bottle and the cap 11 placed over the upper open end of the neck in order to seal the contents therein.

Vigorous shaking of the bottle mixes the contents and the bottle is then immediately up-ended so that the still mixed contents thereof flow through the chamber 23 and into chamber 22 so that when the bottle is returned to the normal vertical position, chamber 22 is full of the material within the bottle in reasonable proportions of the constituents thereof.

The cap is then removed and with chamber 22 on the underside, the contents may be poured therefrom with the baffles 27, 27A, restricting temporarily, the movement of the lighter fraction within the bottle which would normally be poured without the insert being in place.

The baffles also assist in preventing unwanted lighter fractions from entering the closed chamber 22 when the bottle is shaken as well as resticting flow of this fluid when the contents of chamber 22 are being poured therefrom.

Although the invention is designed specifically for use with some salad dressings, sauces and the like, nevertheless it will be appreciated that it can be utilized when it is desired to dispense any substances having different specific gravities which normally separate out one from the other if they are not homogenized.

It will also be appreciated that the number of baffles and the relating sizes of the chambers may vary as well as the size of the opening between the upper end 19 of web 17 and the lid 11.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A dispenser for bottles which include a neck and which may contain two or more unhomogenized immiscible ingredients of different specific gravities comprising a vertically situated web spanning said neck and dividing same into a first chamber and a mutually adjacent, substantially equal volume second chamber, the upper end of said web terminating just below the upper open end of the neck, said first chamber constituting an open ended channel communicating with the interior of the bottle and the open end of the neck thereof and the second chamber having a closed lower end and communicating at the upper end thereof with the upper end of said first chamber and acting as a temporary retaining chamber for a quantity of the contents of the bottle prior to dispensing the contents of the second chamber from the open end of the neck and at least one baffle situated between the ends of the first chamber, the baffle being attached to the web and inclining downwardly across the majority of said first chamber so as to act as a fluid flow retarder.

2. The dispenser according to claim 1 which includes a second baffle extending from said neck, across the majority of the first chamber, above and spaced from said one baffle.

3. The dispenser according to claim 1 which includes a second baffle attached to the web and inclining downwardly across the majority of the first chamber, below and spaced from said one baffle.

4. An insert for the neck of bottles which contain two or more unhomogenized ingredients of different specific gravities, said insert comprising a hollow cylindrical member and a vertically situated web spanning the walls of said member and defining a pair of mutually adjacent substantially equal volume chambers, a first chamber and a second chamber, the upper end of said web terminating just below the open upper end of said cylindrical member, said first chamber constituting an open ended channel communicating with the interior of the bottle and the open end of the neck thereof and the second chamber having a closed lower end and communicating at the upper end thereof with the upper end of said first chamber and acting as a temporary retaining chamber for a quantity of the contents of the bottler prior to dispensing the contents of the second chamber from the open end of the neck and at least one baffle attached to the web and inclining downwardly across the majority of said first chamber between the upper and lower ends thereof so as to act as a fluid flow retarder.

5. The insert according to claim 4 which includes a second baffle extending from the wall of the dispenser, across the majority of the first chamber, above and spaced from said one baffle.

6. The insert according to claim 5 which includes means to detachably secure said insert within the open upper end of an associated bottle, and means comprising an outwardly extending flange formed around the upper end of said cylindrical member thereby restricting the downward positioning of said insert into the neck of the associated bottle, said cylindrical member frictionally engaging within the wall of the neck of the associated bottle.

7. The insert according to claim 4 which include means to detachably secure said insert within the open upper end of an associated bottle, and means comprising an outwardly extending flange formed around the upper end of said cylindrical member thereby restricting the downward positioning of said insert into the neck of the associated bottle, said cylindrical member frictionally engaging within the wall of the neck of the associated bottle.

8. The insert according to claim 4 which includes a second baffle attached to the web and inclining downwardly across the majority of the first chamber, below and spaced from said one baffle.

* * * * *